United States Patent [19]

Onishi et al.

[11] 4,081,849
[45] Mar. 28, 1978

[54] PUSH ROD TYPE TAPE RECORDER OPERATING DEVICE

[75] Inventors: Masanori Onishi; Tadashi Yoshikawa; Kiyoshi Ikoma; Tetsuya Nakakohara, all of Kadoma, Japan

[73] Assignee: Matsushita Electric Industrial Co., Ltd., Japan

[21] Appl. No.: 637,666

[22] Filed: Dec. 4, 1975

[30] Foreign Application Priority Data

Dec. 10, 1974 Japan .............................. 49-149907
Apr. 17, 1975 Japan ................................ 50-47058

[51] Int. Cl.² ...................... G11B 15/02; G01M 1/168
[52] U.S. Cl. ................................. 360/137; 74/483 PB
[58] Field of Search .................... 360/137, 61, 62, 60; 74/483 PB

[56] References Cited

U.S. PATENT DOCUMENTS 3,921,215  11/1975  Asami ................................... 360/137
3,940,800  2/1976   Tabuchi .............................. 360/137

Primary Examiner—Robert S. Tupper
Attorney, Agent, or Firm—Robert E. Burns; Emmanuel J. Lobato; Bruce L. Adams

[57] ABSTRACT

A plurality of parallel push rods is vertically movably supported between an inactive position to which each push rod is normally biased and an active position in which it engages a drive mechanism of the tape recorder. Each of the rods is provided with a notched portion. A latch bar having a plurality of projections arranged along one edge thereof is pivotally supported at one end and has its opposite end biased toward the push rods to permit its projections to engage each of the notched portions of the rods. The notched portion of the rods has a first notch with which the associated projection of the latch bar normally engages when the push rods are in the inactive position and a second notch with which that projection engages to lock the push rod in the active position. At least one of the push rods is provided with a protrusion in the direction toward the latch bar to cause it to rotate about its pivot to unlock another push rod from the active position.

4 Claims, 14 Drawing Figures

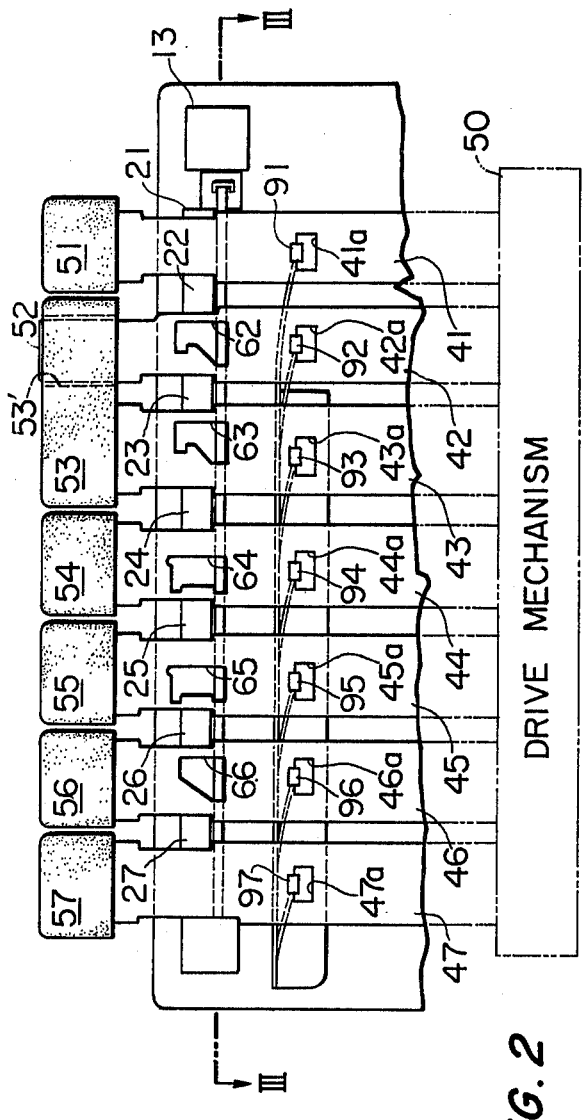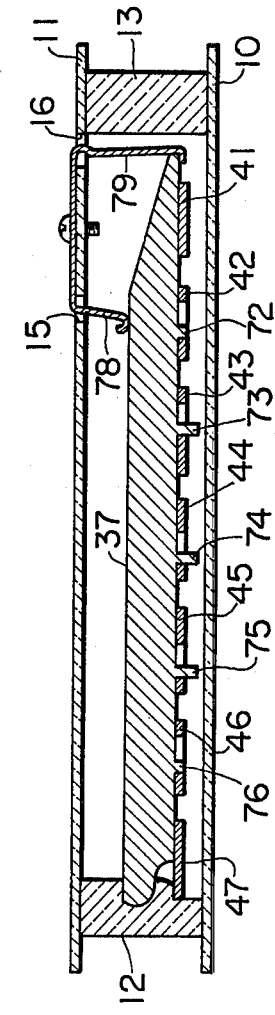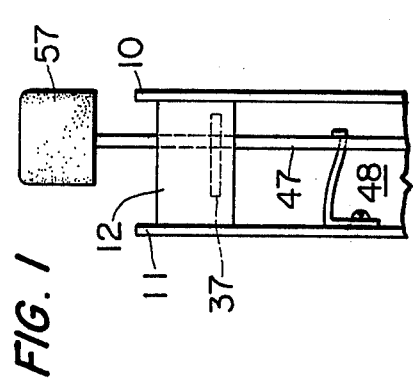

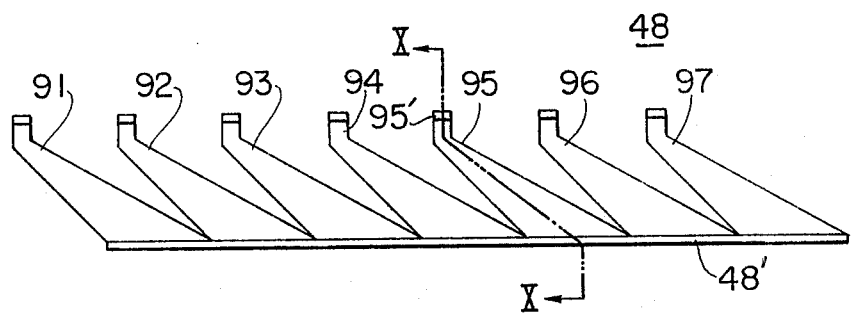
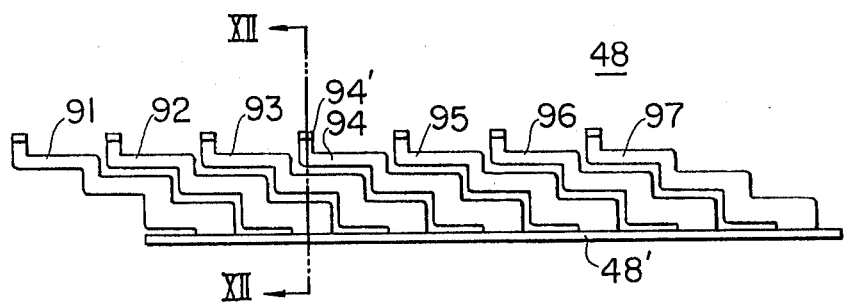
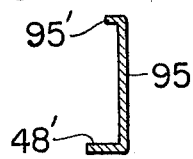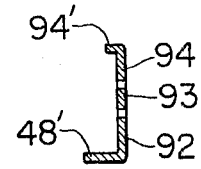
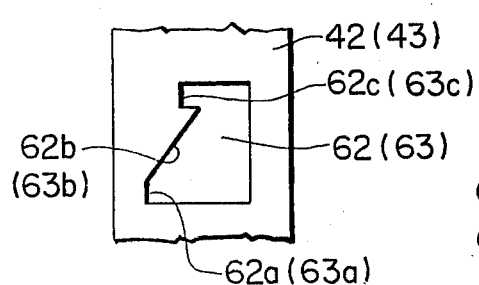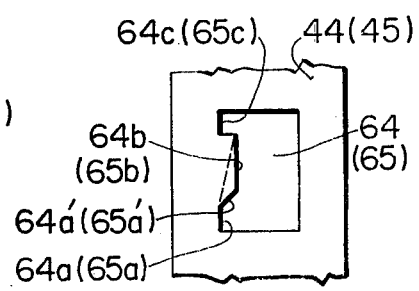

4,081,849

PUSH ROD TYPE TAPE RECORDER OPERATING DEVICE

BACKGROUND OF THE INVENTION

The present invention relates to a tape recorder operating device employing a plurality of push rods with means for locking the push rods to an active position and for unlocking the push rods to an inactive position.

When the tape recorder is operating in the recording mode, "RECORD" and "PLAYBACK" push-buttons or keys are operated. If, under this condition, the user desires to quickly feed or rewind the tape in the so-called "cue" or "review" mode of operation, respectively, in which the user is permitted to hear the recorded sound to facilitate a search for the desired portion of the tape, the "RECORD" button is to be restored, while the "PLAYBACK" button should remain operated. Although these modes of tape operation are advantageous for the user, prior art tape recorder operating devices are complicated in structure to achieve the intended results and require many components with consequential increase in production time and cost.

SUMMARY OF THE INVENTION

The primary object of the present invention is therefore to provide an improved tape recorder operating device which is simple in structure and requires smaller number of components, to be assembled.

BRIEF DESCRIPTION OF THE DRAWINGS

The invention will be fully described by way of example in connection with the accompanying drawings, in which:

FIG. 1 is an end view of the mechanism embodying the present invention;

FIG. 2 is a side view in elevation of the mechanism of FIG. 1 with a front plate removed to show the details of the mechanism;

FIG. 3 is a cross-sectional view taken along the lines III—III of FIG. 2;

FIG. 9 is an embodiment of the spring plate used in the mechanism of the invention;

FIG. 10 is a cross-sectional view taken along the lines X—X of FIG. 9;

FIG. 11 is another embodiment of the spring plate of FIG. 9;

FIG. 12 is a cross-sectional view taken along the lines XII—XII of FIG. 11;

FIG. 13 is an enlarged view of a part of push rods associated with the RECORD and PLAYBACK push-buttons of the mechanism; and FIG. 14 is an enlarged view of a part of push rods associated with the REWIND and FAST-FORWARD push-buttons of the mechanism.

DESCRIPTION OF THE PREFERRED EMBODIMENTS

Figure 4:
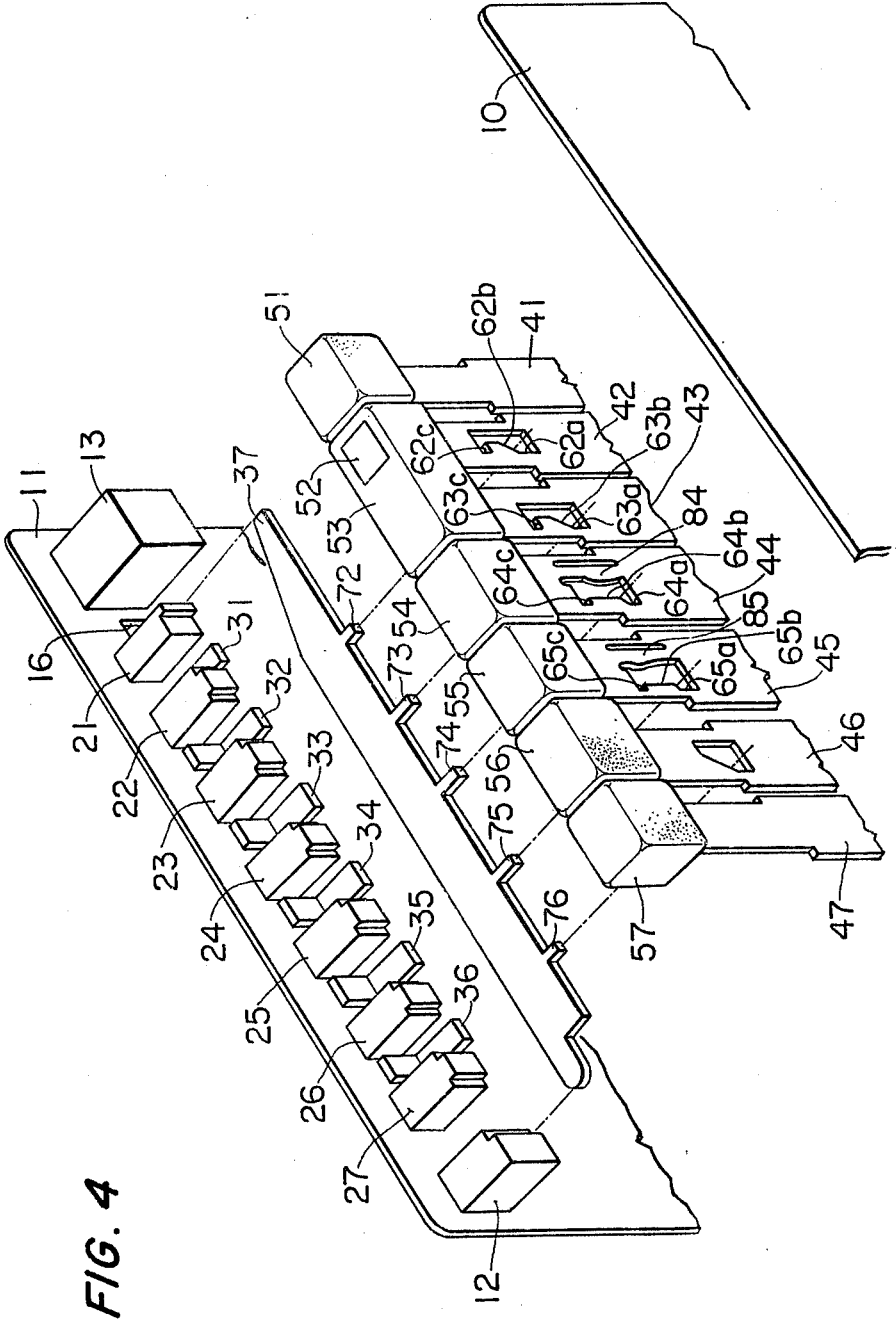
FIG. 4 is an an exploded view in perspective of the mechanism of the invention.

Referring now to the drawings, the push rod mechanism of the present invention comprises a front plate 10 and a rear plate 11 maintained rigidly in spaced parallel relation by end spacers or blocks 12 and 13. On the inner face of the rear plate 11 is disposed a plurality of blocks 21 to 27 adjacent to the upper edge of the rear plate and a plurality of L-section members 31 to 36 each being arranged between adjacent blocks. The L-section members are positioned such that their upright members are displaced a little distance from the lower edge of the blocks 21 to 27 in order to permit a latch bar 37 to be inserted between the blocks and the upright members of the L-section members, as is best seen in FIG. 4. Each of the blocks 22 to 27 has its opposite front edges cut out to form parallel recesses and block 21 has its major front surface also cut out to form a recess.

Slidably disposed between the cutout portions of the blocks 21 to 27 is a plurality of push rods 41 to 47. Each of the push rods 41 to 47 is formed of an elongated metal plate which has its opposite sides cut out slightly by a predetermined depth to snugly fit into the spacing between adjacent recessed portions of the blocks 21 to 27 and block 12 and is provided with a square hole $a$, as best seen from FIG. 2.

On the inner face of the rear plate 11 is attached a leaf spring plate 48 which is provided with a plurality of leaf members 91 to 97 (FIG. 9) extending from the bottom portion 48' of the member 48 to the front plate 10 to project into the holes 41a to 47a of the push rods 41 to 47. The push rods 41 to 47 are thus biased upward and maintained at a predetermined height by means of the blocks 21 to 27.

Various modes of tape operations are triggered by these push rods 41 to 47. In the present embodiment, push rods 41 to 47 are used to provide the functions of "stopping", "recording", "play back", "rewinding", "fast forwarding", "releasing" and "ejection of tape cassette", respectively. The push rods 41 to 47 are provided at their upper ends with heads or push-buttons 51 to 57 to facilitate operation and have their lower ends operatively coupled to a tape drive mechanism 50 in conventional manner. The push-button 53 associated with the playback push rod 43 is provided with a square hole 53' along the length of the push rod 52 so that the push-button 52 is slidably received therein. This permits the playback push-button 53 to be actuated singly or concurrently with the record push-button 52, while preventing the record push-button 52 from being actuated singly while the playback push-button is in the upper retracted position. The record and playback push rods 42 and 43 are provided with identically shaped apertures 62 and 63, respectively, the rewind and fast-forward rods 44, 45 are provided with identical apertures 64 and 65, respectively, and the release push rod 46 with a generally triangular shaped aperture 66.

Each of the apertures 62 to 66 has a contour line which defines the movement of the push rods 42 to 46 as they engage the latch bar 37. As best seen from FIG. 13, apertures 62 and 63 are contoured to form vertical edges 62a and 63a, respectively, at the lower portion thereof and notches 62c and 63c, respectively, at the upper portion thereof connected to the lower edges 62a and 63a by inclined edges 62b and 63b, respectively. The notches 62c and 63c are located at positions slightly displaced laterally from the lower vertical edges 62a and 63a. Apertures 64 and 65 (FIG. 14) are contoured to form lower notches 64a and 65a, respectively, at the lower portion thereof and upper notches 64c and 65c, respectively, at the upper portion thereof connected to the lower notches 64a and 65a by straight edges 64b and 65b, respectively. The lower notches 64a and 65a are contiguous with the straight edges 64b and 65b by inclined edges 64a' and 65a', respectively. It may be understood that the lower and upper notches 64a (65a) and 64c (65c) may be connected by an inclined edge as indicated by the dashed lines in FIG. 14, and that they are formed such that they extend to the points which are in alignment with each other as illustrated. Aperture 66 has a wider width at the lower edge thereof than at the upper edge and an inclined edge connecting the two edges.

The latch bar 37 is provided with projections 72 to 76 which extend to the front plate 10 to engage the apertures 62 to 66 of the push rods 42 to 46, respectively. The projections 72 and 76 have the depth of the thickness of the push rods 72 and 76, while the projections 73 to 75 have the depth twice as much as the depth of the projections 72 and 76 (FIG. 3). The latch bar 37 has its one end pivoted at a recess provided in the block 12. The free end of the latch bar 37 is supported by leaf springs 78 and 79. These springs are integrally formed of a single metal member and secured to the rear side of the rear plate 11 through apertures 15 and 16 such that the spring 78 urges the latch bar 37 toward the front plate 10 while the spring 79 urges it toward the pivot point in block 12.

The latch bar 37 is disposed in the space between the blocks 21 to 27 and the L-section members 31 to 36 so that the front side edge of the latch bar 37 is in urgingly contact with the inner surface of the push rods 41 to 47 with its projections 72 to 76 being received in the respective apertures 62 to 66.

Adjacent to the apertures 64 and 65, the rewind and fast-forward push rods 44 and 45 are punched out toward the rear plate 11 to form protrusions 84 and 85, respectively, each extending to a point substantially equal to the depth of projection 72.

In FIG. 9, the spring plate 48 is cut out to form a set of blades 91 to 97 extending from the base plate 48' which is attached to the inner face of the rear plate 11. Each of the blades 91 to 97 is tapered toward its end which is bent at right angles to form a flange 95' as indicated in FIG. 10. These blades have their flanges engaged with the holes 91 to 97 of push rods 41 to 47. Preferably, each of the spring blades 91 to 97 is shaped to form a staircase as shown in FIGS. 11 and 12. The staircase-shaped blades permit a design in which the tension required for each blade is easily determined by the width of rectangular blade sections which form the staircase.

Figure 5:
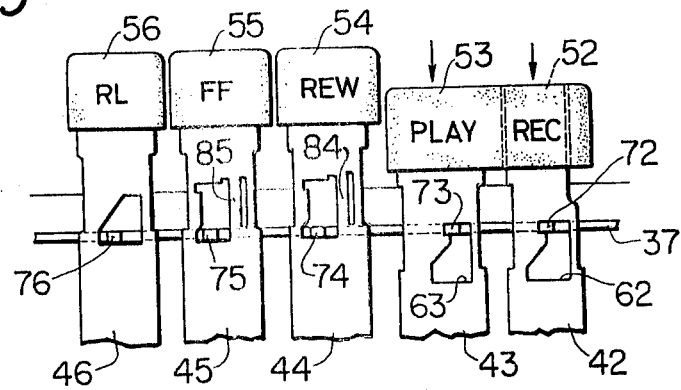
FIG. 5 is a side elevation of a part of the push rod mechanism in the recording mode.

The actual operation of the push-buttons 51 to 57 will be described in connection with FIGS. 5 to 8. The stop button 51 while depressed downward serves to stop the drive mechanism 50 to momentarily cease the transport movement of the tape (not shown) in conventional manner. When the record and playback buttons 52 and 53 are concurrently depressed, the projections 72 and 73 of latch bar 37 are caused to disengage from contact with the edges 62a and 63a, respectively, and move along the edges 62b and 63b, respectively, against the action of spring 79 and come into engagement with the edges or slots 62c and 63c, respectively. During this process, the other projections 74 to 76 are also caused to move in the respective apertures of the push rods 44, 45 and 46 and restore to the previous positions (FIG. 5). With the projections 72 and 73 being inserted into the recessed or slotted portions 62a and 63a, respectively, the record and playback push rods 42 and 43 are held depressed to permit the drive mechanism 50 to operate in the "Recording" mode.

Figure 6:
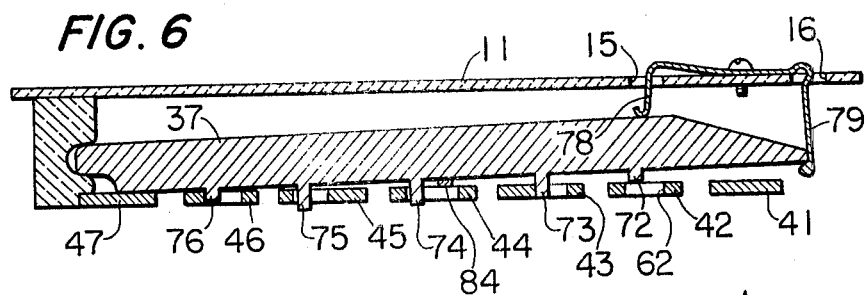
FIG. 6 is a cross-sectional view of the mechanism taken along the lines III—III of FIG. 2 in which the REWIND push-button is shown operated to release the RECORD push-button of FIG. 5.
Figure 7:
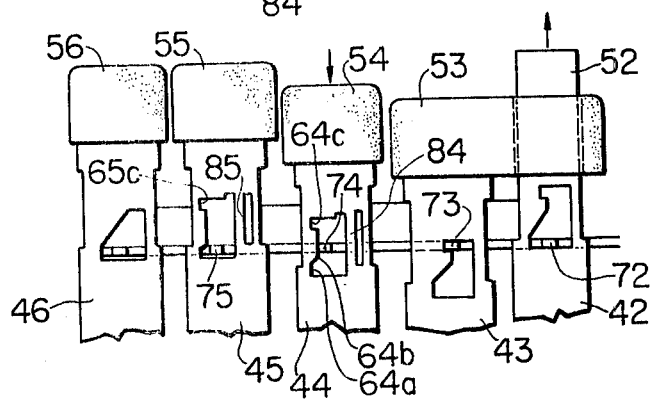
FIG. 7 is a partial side elevation of the mechanism as in FIG. 5 showing the operation of the REWIND button in the recording mode.
Figure 8:
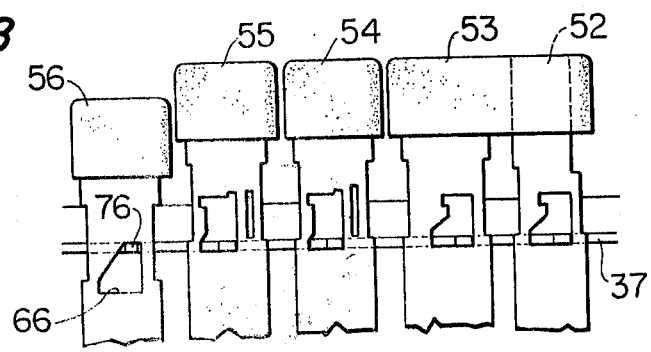
FIG. 8 is a fragmentary side elevation of the mechanism as in FIG. 5 showing the operation of the RELEASE button to unlock the other push-buttons.

With the push rods 42 and 43 so held in the depressed positions, the rewind button 54, when depressed, will cause the protrusion 84 to come into abutment with the front side edge of the latch bar 37 to push it toward the rear plate 11 so that the latch bar rotates about its pivot point in a counterclockwise direction against the action of spring 78. This causes the projection 72 to disengage from the aperture 62 of the record push rod 42 as illustrated in FIG. 6, thus allowing the record push rod 42 to move back to the original position by the action of leaf spring 48b (FIG. 7). Because of the greater length of the projection 73 than that of the projection 72, the projection 72 remains engaged with the playback rod 43. It is to be noted that with the record or playback rod 52 or 53 being held in the locked positions, the latch bar 37 is in a position slightly displaced from the original position against spring 79 by the projections 72 and 73 engaging the slots 62c and 63c which are displaced laterally from the position of the edges 62a and 63a, respectively, to the right as seen from FIG. 5. Therefore, the projections 74 to 76 are also displaced from the normal positions. The rewind button 54, when depressed to the fullest extent, the projection 74 is not allowed to engage with the slot 64c and thus prevents the rewind button 54 from being locked. Under these conditions, the magnetic tape is rewound at a high speed while in contact with the playback magnetic head (not shown) as long as the rewind button is depressed, so that the tape recorder is in the so called "Review" mode of operation.

With the record button 52 and playback button 54 being locked as shown in FIG. 5, the depression of fast-forward button 55 will cause its protrusion 85 to come into abutment with the front side edge of latch bar 37 and pushes it toward the rear plate 11 against the action of spring 78, the projection 72 will be disengaged from the aperture 62 of the record push rod 42 to allow it to restore to its original position, in the same manner as previously described. Since the projection 75 is free from the edges of aperture 65 due to the displacement of the latch bar 37 as described above, the fast-forward button 55 is unlocked and the tape recorder is in the "fast-forward" mode as long as the fast-forward button 55 is depressed. Under these conditions, the magnetic tape is wound in the same direction as in the playback mode while in contact with the playback head so that the so-called "cueing" action is provided.

When the rewind button 54 or fast-forward button 55 is operated with the other buttons being in the normal upward positions, the projection 74 or 75 will slide along the contour of the aperture 64 or 65 by the action of spring 79 and engages the slot 64c or 65c to lock the bar 54 or 55. The rewind and fast-forward modes of operation continue until the release button 56 is operated.

When the release button 56 is depressed to the fullest extent, the projection 76 is caused to move in opposition to the action of spring 79 by the adjacent edge of aperture 66 to such an extent that all the other projections are displaced and freed from contact with the associated push bars, thus allowing them to return to their normal positions.

It should be noted however that the essential functions of the tape recorder operating device of the invention are provided by the push rods 42 to 46 since the functions of "STOP" and "EJECTION" may be effected by an arrangement other than the push rods 41 and 47.

In the foregoing description, the invention has been described in connection with push-button mechanism, it should also be understood that a plurality of piano type keys may be coupled to the push rod mechanism of the present invention by employing a means for translating the angular movement of the keys about their pivot to the longitudinal movement of the push rods.

Other modifications are apparent to those skilled in the art without departing from the scope of the present invention which is only limited by the appended claims. Therefore, the embodiments shown and described are only illustrative, not restrictive.

What is claimed is:

1. A tape recording and reproducing apparatus comprising:
   a slidable latch bar having first, second, third and fourth projections arranged along the length thereof, the first projection having a smaller extent than the extent of the other projections, the latch bar being rotatable about a pivot at one end thereof;
   first means for obtaining a recording operation and including a recording push rod having a first cutout portion engageable with said first projection of said latch bar when the recording push rod is in an operative state;
   second means for obtaining a playback operation and including a playback push rod having a second cutout portion engageable with said second projection of said latch bar when the playback push rod is in an operative state, and further operable to remain in the operative state when said recording push rod is in the operative state to effect said recording operation;
   third means for obtaining a rewind operation and including a rewind push rod having a third cutout portion engageable with said third projection of said latch bar when the rewind push rod is in an operative state and having a first cam portion engageable with said latch bar to rotate the same about said pivot to such an amount that said first projection is disengageable from said first cutout portion of the recording push rod; and
   fourth means for obtaining a fast forward operation and including a fast forward push rod having a fourth cutout portion engageable with said fourth projection of said latch bar when the fast forward push rod is in an operative state and having a second cam portion engageable with said latch bar to rotate the same about said pivot to such an amount that said first projection is disengageable from said first cutout portion.

2. A tape recording and reproducing apparatus as claimed in claim 1, wherein said recording push rod is positioned at a point farther than the rewind and fast forward push rods from said pivot point of said slidable latch bar.

3. In a tape recording and reproducing apparatus comprising: means including a recording push rod for effecting a recording operation; means including a playback push rod for effecting a playback operation; means including a rewind push rod for effecting a rewind operation, means including a fast forward push rod for effecting a fast forward operation, and a slidable latch bar extending at right angles to said push rods and having a plurality of projections each engageable with a corresponding one of said push rods when said corresponding push rod is in an operative state, the combination therewith comprising a spring structure comprising an elongated member disposed at right angles to said push rods and a plurality of longitudinally spaced staircase-like sections, each of said sections being rigidly connected at one end to said elongated member and having a plurality of transversely and longitudinally extending portions arranged such that a transversely extending portion of each section is adjacent to and parallel to a transversely extending portion of an adjacent section and a longitudinally extending portion of each section is adjacent to and parallel to a longitudinally extending portion of the adjacent section so that the longitudinal dimension of each staircase-like section is greater than the spacing between adjacent ones of said sections, the opposite end of each of said staircase-like sections being connected to a corresponding one of said push rods to bias the same to remain in an inoperative state.

4. The combination as claimed in claim 3, wherein the transverse portions of each of said staircase-like sections decreases in dimension in the direction away from said elongated member.

* * * * *